US005913156A

United States Patent [19]

Rühl

[11] Patent Number: 5,913,156

[45] **Date of Patent: *Jun. 15, 1999**

[54] RECEIVER STORING SPELLINGS FOR RDS-TMC MESSAGES USING SEPARATORS FOR DIFFERENT LANGUAGE SPELLINGS

[75] Inventor: Hans-Wilhelm Rühl, Röthenbach, Germany

[73] Assignee: Mannesman VDO AG, Frankfurt, Germany

[ * ] Notice: This patent is subject to a terminal disclaimer.

[21] Appl. No.: 08/679,871

[22] Filed: Jul. 15, 1996

[30] Foreign Application Priority Data

Jul. 26, 1995 [DE] Germany ............................ 195 27 186

[51] Int. Cl.$^6$ ............................ H04B 1/18

[52] U.S. Cl. ............................ 455/186.1

[58] Field of Search ............................ 455/45, 46, 38.1, 455/38.4, 158.1–158.5, 185.1, 186.1, 186.2, 226.1, 345; 704/1, 7, 8, 200, 201, 204; 233/380, 382

[56] References Cited

U.S. PATENT DOCUMENTS

| | | | |
|---|---|---|---|
| 4,541,069 | 9/1985 | Kanou et al. | 704/7 |
| 4,870,402 | 9/1989 | De Luca et al. | 704/8 |
| 5,001,753 | 3/1991 | Davio et al. | 380/29 |
| 5,020,143 | 5/1991 | Duckeck et al. | 455/186.1 |
| 5,146,499 | 9/1992 | Geffrotin | 380/23 |
| 5,163,154 | 11/1992 | Bournas et al. | 395/775 |
| 5,168,521 | 12/1992 | Delaporte et al. | 380/29 |
| 5,193,214 | 3/1993 | Mardus et al. | 455/186.1 |

OTHER PUBLICATIONS

Funkschau 8/91, I Spezial, pp. 22–26.

*Primary Examiner*—Thanh Cong Le
*Attorney, Agent, or Firm*—Mayer, Brown & Platt

[57] ABSTRACT

A broadcast receiver, comprises a control circuit (7) for delivering encoded messages, derived from a broadcast signal, to at least one storage device (12, 28), for receiving control data, derived from the encoded messages, from at least one storage device (12, 28), and for forming the messages from the control data in a form suitable for a display device (13) and/or a speech synthesizer circuit (14). In order to reduce the data file, the control data stored under an encoded message in at least one storage device (12, 28) contains at least one spelling of a first language and given spellings of predetermined further languages if they deviate from the first language. A spelling is to be understood to mean a phonetic notation. The spellings of all further languages comprise a respective introductory separating mark.

17 Claims, 3 Drawing Sheets

RECEIVER STORING SPELLINGS FOR RDS-TMC MESSAGES USING SEPARATORS FOR DIFFERENT LANGUAGE SPELLINGS

TECHNICAL FIELD

The invention relates to a broadcast receiver, comprising a control circuit for

- delivering encoded messages, derived from a broadcast signal, to at least one storage device,
- receiving control data, derived from the encoded messages, from at least one storage device, and
- forming the messages from the control data in a form suitable for a display device and/or a speech synthesizer circuit.

BACKGROUND

A broadcast receiver of this kind is known from the magazine Funkschau 8/92 I Spezial, pp. 22 to 26. Audio signals derived from the broadcast signal received in this broadcast receiver are processed in an audio circuit. Furthermore, RDS and TMC data is derived from the broadcast signal. RDS stands for Radio Data System and TMC for Traffic Message Channel. TMC is a functional extension of RDS. RDS-TMC data is transmitted as digital encoded data with the broadcast signal. TMC enables the listener, for example to fetch traffic messages stored in the broadcast receiver as often as desired before or after the start of driving, to listen to traffic messages selectively in conformity with the relevant route, and to have traffic messages spoken in the listener's native language, regardless of the relevant national language. Hereinafter, the RDS-TMC data will also be referred to in general as encoded messages. It is also feasible to transmit not only encoded traffic messages but also weather reports and other messages by way of RDS-TMC data or similar encoded data. The encoded messages received are applied to a storage device which applies control data to a control circuit in response thereto. A storage device comprises a data file for forming traffic messages and may be, for example a semiconductor memory connected to the control circuit, a semiconductor memory on a chip card, a CD-ROM etc. From the cited document it is known that the control data constitutes designations in an orthographic notation of a language which are to be output as speech. Orthographic is to be understood to mean hereinafter the correct spelling of designations of a language. In order to enable the designations to be output as speech, the control circuit can access, for example a stored digitally encoded speech signal file.

It is an object of the invention to provide a broadcast receiver having a reduced data file.

This object is achieved by a broadcast receiver of the kind set forth in that the control data stored in at least one storage device under an encoded message contains at least one spelling of a first language and contains given spellings of predetermined further languages if they deviate from the first language, and that the spellings of all further languages comprise a respective introductory separating mark.

A storage device supplies the broadcast receiver in accordance with the invention with control data stored under an encoded message. Such a storage device may be, for example an internal storage device (for example, a semiconductor memory) of the broadcast receiver and/or an external storage device (for example, a semiconductor memory on a chip card). The control data contains spellings of a plurality of languages. Such a spelling may be, for example, an orthographic notation (for example, Röthenbach an der Pegnitz), a phonetic notation or a notation which can be displayed on a display device (for example, Röthenb./Peg.) for a plurality of languages. In order to minimize the data file, the spellings of a first language are complete and the spellings of the further languages are contained in the control data only if they deviate from the first language. For example, if the first language is German and the further languages are English, French and Dutch, for example the orthographic entries for the location "Köln" are as follows: in the first language (German) "Köln", in the second language (English) "Cologne", in the third language (French) "Cologne" and in the fourth language (Dutch) "Keulen". For the location "Lauf" there is only one orthographic entry for the first language (German), because for this location there is no different orthographic notation in the English, the French or the Dutch language. In order to distinguish the spellings of the various further languages, they comprise a respective introductory separating mark and have a predetermined length (predetermined string length) like the spellings of the first language.

For a further reduction of the data file there is provided at least one storage device for the storage of given control data under a respective escape code. The control data stored under an escape code in at least one storage device contains at least one spelling of a first language and given spellings of predetermined further languages if they deviate from the first language. The spellings of all further languages commence with a respective separating mark. The control circuit is arranged to apply, after reception of control data containing at least one escape code, at least one escape code to a storage device and to receive the control data stored under the escape code.

Control data associated with an escape code is stored in one or more storage devices. Control data associated with such an escape code contains frequently used designations, for example "Köln", "Anschlußstelle" etc. If the control circuit receives control data from the storage device which corresponds to an encoded message and which contains at least one escape code, the corresponding message (for example, a traffic message) for a speech synthesizer circuit and/or a display device can be formed only after the control data stored under an escape code has been applied to the control circuit. Because such escape codes requires less storage space than the control data, the data file is thus reduced. This is advantageous notably if the broadcast receiver is used for traffic information purposes and the data of a large traffic region (for example, Germany) is stored in a storage device. A further advantage of the invention consists in that suitable selection of control data stored under an escape code enables minimization of errors which could occur during the building up of the data file and would become visible or audible via the display device and/or the speech synthesizer circuit. A suitable selection of control data filed under an escape code is to be understood to mean herein a selection of word sequences, words and word parts (designations) from a linguistic point of view.

It may occur that for the formation of the message for the display device and/or the speech synthesizer circuit the control circuit need access at least one storage device several times in order to read the control data filed under escape codes. This can be explained on the basis of two examples. For the designation "Anschlußstelle Köln-Mühlheim" (junction Cologne-Mühlheim) "12365-Mühlheim" or "78654 43263-Mühlheim" could be stored as control data in a storage device. In the first case the control circuit reads, for example the control data "32987 Köln" for the escape code "12365". Subsequently, the control data (in this case: "Anschlußstelle") must still be read for the escape code "32987" in order to compose the designation. In the second case the control circuit extracts the designations "Anschlußstelle" and "Köln" from at least one storage device under the escape codes "78654" and "42263".

In a further version of the invention, the spellings of further languages contain a first introductory separating mark if they have been stored in a standard order, and otherwise a second introductory separating mark and a subsequent mark which characterizes the language.

When the spellings of the further languages have been stored in a given order (standard order), they are always introduced by way of a first separating mark. If the standard order after the German language is, for example English, French and Dutch, the first separating mark is used. The standard order also exists if entries of the Dutch language and also of the French language are omitted, for example because only the English spelling deviates from the German spelling. The standard order is then no longer present if at least one $k^{th}$ spelling of n spellings (n<k) is not present. This occurs if, for example the German entry is followed by the French and the Dutch entry, so that the English entry is absent. Such an order would occur if only entries in French and Dutch could be distinguished from the German language. In this example, the spellings of the further languages (French, Dutch) are introduced by a second separating mark and a subsequent mark which characterizes the language. A further data reduction can thus be achieved.

In a further version of the invention, the control data stored in at least one storage device under a respective encoded message or an escape code contains the extractable orthographic and/or phonetic notation of at least one first language and the extractable orthographic and/or phonetic notation of at least one further language only if the orthographic and/or phonetic notation of the further language deviates from that of the first language.

At least one storage device contains lists which are associated with storage sections and contain specific control data associated with a respective encoded message, and also an escape list with the escape codes and the respective associated control data. Such lists may be a location list, an area location list, a segment location list, a standard phrase list, etc. The location list contains location designations (for example, towns) whereas the area location list contains traffic areas, (for example, the Ruhr area), administrative areas (for example, Mittelfranken) or tourist areas (for example, Teutoburger Wald); the segment location list contains road segments and the standard phrase list contains parts of a traffic message (for example, 10 km traffic jam). The location, area location and segment location lists are region-specific lists, whereas the standard phrase list is a result-specific list.

The control circuit is arranged to supply region-specific control data from a first storage device and result-specific control data from a second storage device. The first storage device may then contain an escape list with region-specific control data and the second control device a list with event-specific control data.

The first storage device could form part of a chip card for use in a card reader. The configuration of such chip cards and their operation are described, for example in the documents U.S. Pat. Nos. 5,001,753, 5,146,499, 5,163,154 and 5,168,521. The advantage of such chip cards consists in that in a broadcast receiver they serve to decode traffic messages for a given region, so that they can be readily exchanged when the location or the region changes.

The invention also relates to a module for the processing of encoded messages derived from a broadcast signal, comprising a control circuit which is arranged to deliver encoded messages, derived from the broadcast signal, to at least one storage device, receive control data, derived from the encoded messages, from at least one storage device, and form the messages from the control data in a form suitable for a display device and/or a speech synthesizer circuit.

The control data stored under an encoded message in at least one storage device contains at least one spelling of a first language and spellings of predetermined further languages if they deviate from the first language. The spellings of all further languages comprise a respective introductory separating mark.

The invention also relates to a storage device for a broadcast receiver, or for a module for the processing of encoded messages derived from a broadcast signal, for the storage of control data for a respective encoded message. The storage device stores control date, under an encoded message, of at least one spelling of a first language and given spellings of predetermined further languages if they deviate from the first language. The spellings of all further languages comprise a respective introductory separating mark. Such a storage device may form part of a chip card whereto the invention also relates.

BRIEF DESCRIPTION OF THE DRAWINGS

Embodiments of the invention will be described in detail hereinafter with reference to the Figures. Therein.

DETAILED DESCRIPTION OF THE PREFERRED EMBODIMENT

Figure 1:
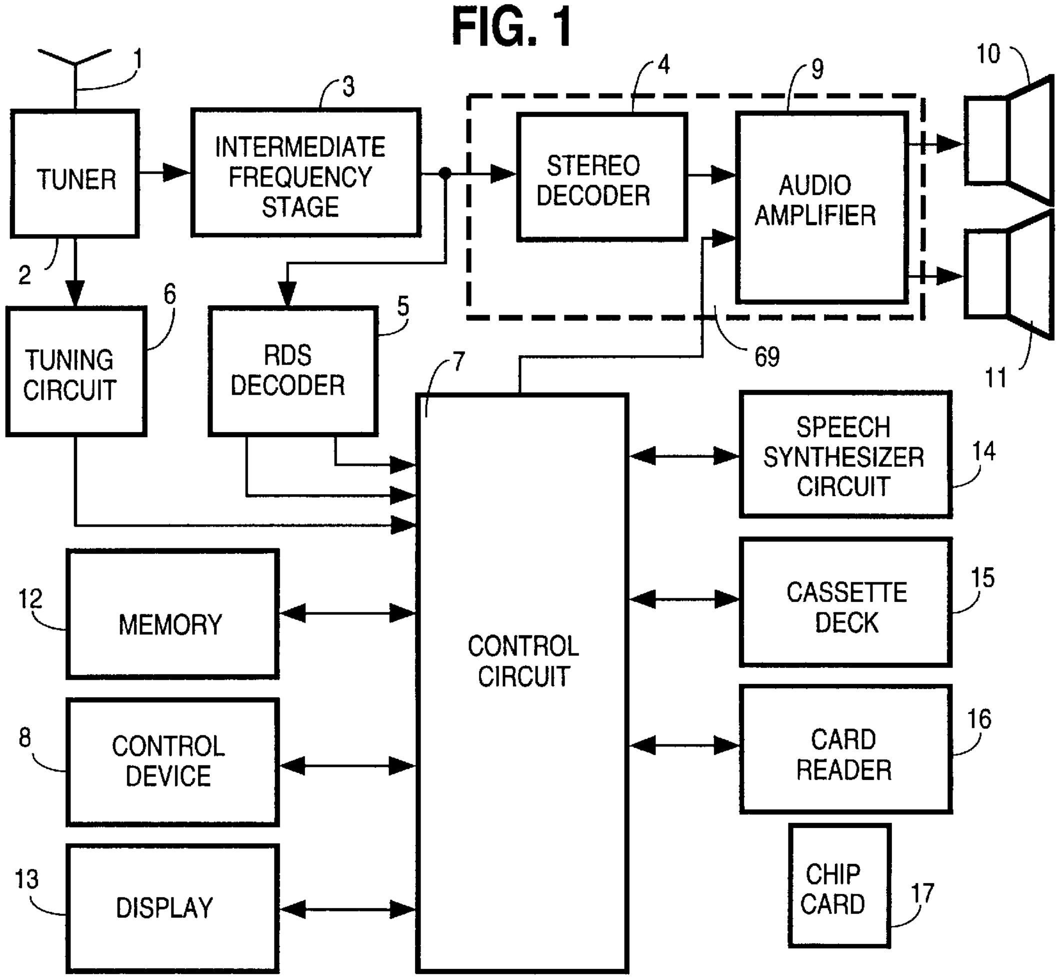
FIG. 1 shows a first embodiment of an RDS-TMC broadcast receiver.

FIG. 1 shows a broadcast receiver for the processing of broadcast signals and for the decoding and further processing of RDS-TMC data. RDS stands for Radio Data System and supplies the listener with, for example traffic messages, data concerning alternative frequencies for the station tuned to, etc. TMC stands for Traffic Message Channel and constitutes a functional extension of RDS. RDS-TMC data representing encoded messages is transmitted as digital encoded data with the broadcast signal. TMC enables the listener, for example to fetch traffic messages stored in the broadcast receiver as often as desired before or after the start of driving, to listen to traffic messages selectively in conformity with the relevant route, and to have traffic messages spoken in the listener's native language, regardless of the relevant national language.

The broadcast signal received by an aerial 1 of the RDS-TMC broadcast receiver (FIG. 1) is applied to a stereo decoder 4 and an RDS decoder 5 via a tuner 2 and an intermediate frequency stage 3. The tuner 2 is controlled by a tuning circuit 6 which is adjusted by a control circuit 7 and a control device 8 connected thereto. The stereo decoder 4 supplies low-frequency stereo signals which are applied to two loudspeakers 10 and 11 via an audio amplifier 9. The stereo decoder 4 and the audio amplifier 9 form an audio circuit 69. The RDS decoder 5 extracts RDS-TMC data from the low-frequency signal supplied by the intermediate frequency stage 3. The RDS-TMC data and a clock signal are applied to the control circuit 7 by the RDS decoder 5.

A memory 12, a display device 13, a speech synthesizer circuit 14 and possibly one or more further devices 15, for example a cassette deck, a CD player, a car telephone etc., are also coupled to the control circuit 7. The memory 12 constitutes a second storage device. A card reader 16 which exchanges data with a chip card 17 for further processing is also connected to the control circuit 7.

Figure 2:
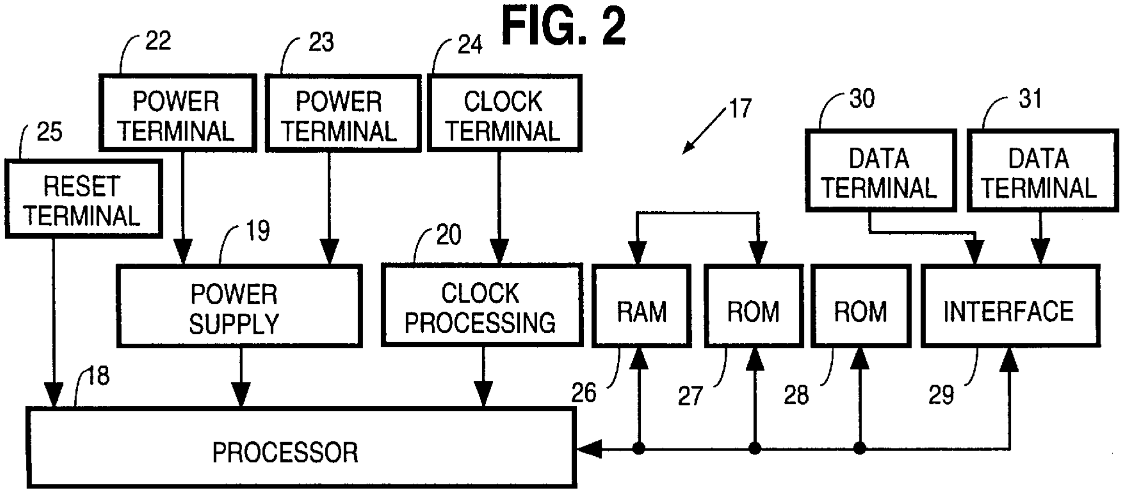
FIG. 2 shows the logic structure of data stored on a chip card for use, for example in the RDS-TMC broadcast receiver shown in FIG. 1.

The construction of such a chip card 17 is shown in the form of a block diagram in FIG. 2. The core element of the chip card 17 is a processor 18 which is coupled to a power supply circuit 19, a clock processing circuit 20 and a bus 21. The power supply circuit 19 is connected to two terminals 22 and 23 via which the power supply between the card reader 16 and the chip card 17 is established. Furthermore, via a terminal 24 the clock processing circuit 20 receives a clock signal from the card reader 16. In the clock processing circuit 20 further clock signals can be extracted from the clock signal. A further terminal 25, via which a reset signal can be supplied by the card reader 16, is connected to the processor 18. A random access memory 26 (referred to hereinafter as RAM), a read-only memory 27 (referred to hereinafter as program ROM), a read-only memory 28 (referred to hereinafter as data ROM) and an interface unit 29 are coupled to the bus 21. Data is exchanged between the card reader 16 and the chip card 17 via the interface unit 29 and two terminals 30 and 31 connected thereto. The program ROM 27 stores the program required for operation of the processor 18; the RAM 26 contains data which occurs during operation and which can be modified, and the data ROM 28 contains the TMC data. At least the data ROM 28 forms part of a first storage device.

The control circuit 7 in FIG. 1 applies a part of the TMC data received, representing respective encoded messages, to the chip card 17 via the card reader 16. The chip card 17 returns data derived therefrom to the control circuit 7 which converts this data, with TMC data derived from the memory 12, into control data for the speech synthesizer circuit 14 and/or for the display device 13. After reception of the control data, the speech synthesizer circuit 14 applies synthesized speech to the audio amplifier 9, via the control circuit 7. The control circuit 7 at the same time connects the inputs in the audio amplifier 9 in such a manner that instead of the stereo signal from the stereo decoder 4 a synthesized speech signal from the speech synthesizer circuit 14 is applied to the loudspeakers 10 and 11 via the control circuit 7 and the audio amplifier 9. The display device 13 receives control data representing a message in an orthographic notation from the control circuit 7.

Figure 3:
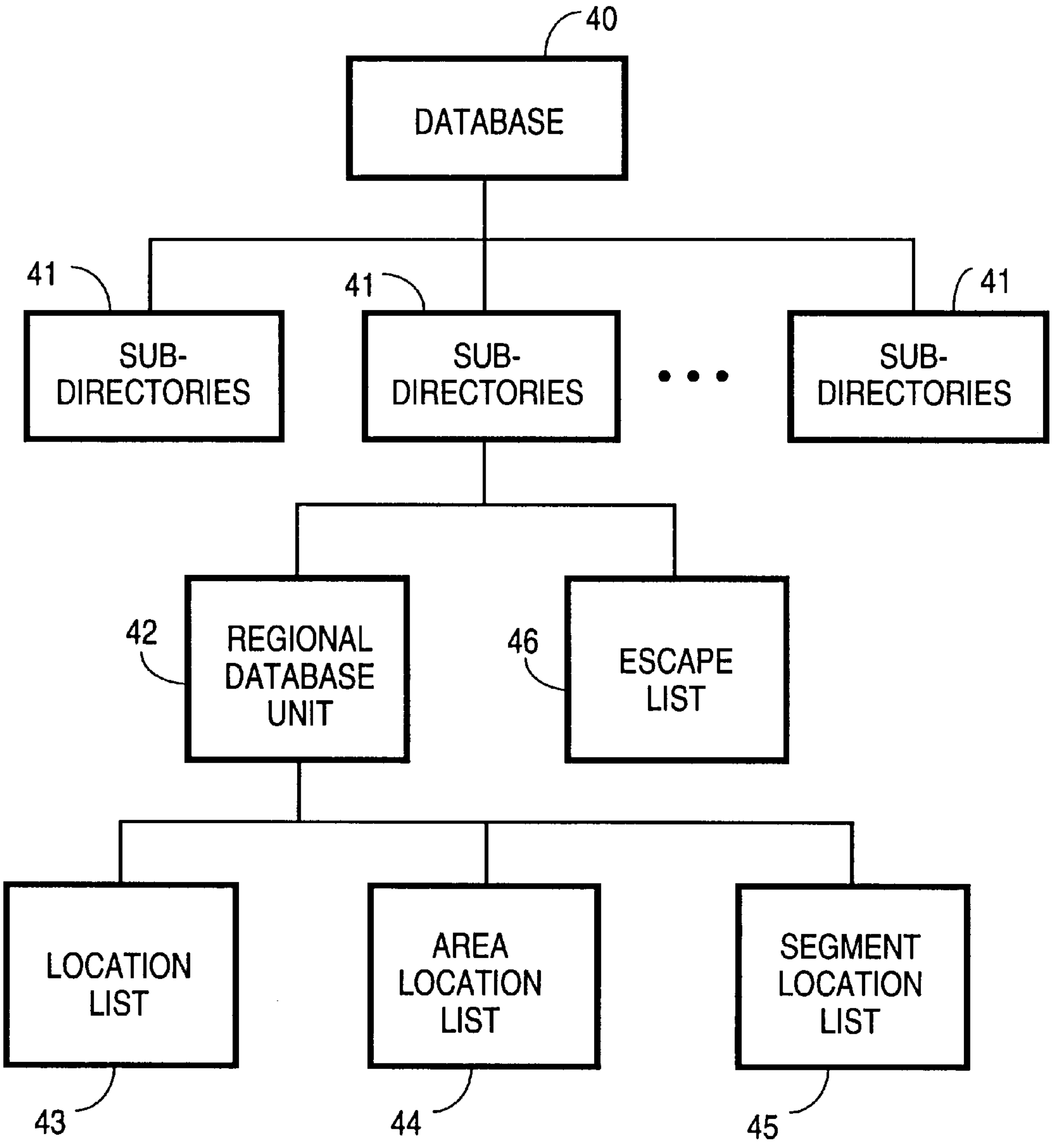
FIG. 3 shows a second embodiment of an RDS-TMC broadcast receiver which comprises a module for the processing of RDS-TMC data which is coupled to the RDS-TMC broadcast receiver.

The TMC data thus contains encoded traffic messages which are decoded by means of the chip card 17, the memory 12 and the control circuit 7 so as to be converted into synthesized speech and into a display version for the display device 13. The data ROM 28 stores a TMC data base 40 (TMCDB) whose logic configuration as a binary data file will be described with reference to FIG. 3.

The TMC data base 40 (TMCDB) has a directory structure with a main directory with inter alia global data, geographic messages (GMS messages; GMS=Geographic Message Selection) and a data base volume list.

The global data includes an identification number of the TMC data base 40, reference coordinates relating to geodatic coordinate system to a comer of the database interval coordinate system and a scaling factor. In the TMC data base 40, local coordinates of a new coordinate system are stored and used. The coordinates of the new, stored coordinate system can be recalculated into the coordinates of the geodetic coordinate system using the scaling factor and the reference corner given in geodetic coordinates.

The geographic messages contain data concerning the transmitter in the relevant regional area. The transmitter information includes a frequency offset factor (PI code= Program Identification code) whereby the transmission frequency can be determined, and coordinates concerning the site of the transmitter and its broadcasting range.

The frequency offset factor is used to adjust the carrier frequency of the broadcast signals, with RDS-TMC signal components, received by the tuner 2. A carrier frequency is determined, for example by multiplication of the frequency offset factor by the frequency unit 0.1 MHz and by addition of the start frequency value 87.6 MHz. A frequency offset factor 0 means, for example a carrier frequency of 87.6 MHz whereas a frequency offset factor 203 means a carrier frequency of 107.9 MHz. This calculation can be performed in the processor 18 of the chip card 17 or in the control circuit 7 of the broadcast receiver. The tuning circuit 6 tunes the tuner 2 in conformity with the frequency determined.

The data base volume list refers to at least one subdirectory 41 (VOL) in which identification data, data of a regional data base unit 42 (RDB) and an escape list 46 (ESC) are stored. The identification data consists of an EBU code (EBU=European Broadcasting Union) and an encoded number (data base number). The EBU code designates the country for which messages are stored in the regional data base unit 42. The encoded number serves to address the regional data base unit 42 which contains data for one or more regions in which the chip card 17 is to be used. A region is a given area which includes parts of a country, a country or even several countries partly or completely.

A regional data base unit 42 contains a location list 43 (LOL), an area location list 44 (ALL), and a segment location list 45 (SLL). The lists are stored each time in one or several storage sections. The location list 43 contains location indications, for example towns, highway exits, ferry terminals. The area location list 44 indicates traffic regions (for example, the Ruhr area), administrative regions (for example, Mittelfranken), or tourist regions (for example, Teutoburger Wald). The segment location list 45 contains road segments.

The escape list 46 (ESC) is also stored in one or more storage sections. The escape list 46 serves for (region-specific) compression of location and area names. The list 46 stores designations and name components which repeatedly occur in the location list 43, the area location list 44 and the segment location list 45. For example, the location list contains not only the location "Köln", but also several city districts such as Köln-Dellbrück, Köln-Kalk, Köln-Porz etc. In order to reduce the memory demand of the location list, it contains an escape notation for the city of "Köln". The escape notation is exactly specified via the escape list 46. For each designation or name component the escape list 46 contains a respective escape notation which forms an address (for example, 2429) in the escape list 46, and the designation or the name component to be replaced in an orthographic and a phonetic notation. Some examples of entries in a feasible escape list 46 are given hereinafter:

| EC | RS | LS |
|---|---|---|
| 2209 | Passau | "pas$aU |
| 2367 | Dortmund | "dORt$mUnt |
| 2388 | Euskirchen | "?OYs"kIR$C@n |
| 2418 | Oberhausen | "?:$b=6$haU$z@n |
| 2429 | Köln | "k9ln |
| 2438 | Olpe | "Ol$p@ |
| 2444 | Rade | "Ra:$d@ |
| 2509 | A1 | ÜA1) |
| 2511 | A3 | ÜA3) |

In the above extract from an escape list 46, for example the escape character 2438 represents the location name "Olpe" in an orthographic and a phonetic ("?O1$p@) notation. The first column thus stores the escape code (EC), the second column a designation in an orthographic notation (RS), and the third column a designation in a phonetic notation (LS). For the phonetic notation use is made of SAMPA (SAMPA=Speech Assessment Methods Phonetic Alphabet). Frequently used name components (for example, Anschlußstelle, Autobahnkreuz etc.) which are not region-specific but traffic-specific can be stored in an additional escape list in the memory 12 of the RDS-TMC broadcast receiver instead of in the escape list 46. Such a feasible additional escape list could contain the following entries:

| EC | RS | LS |
|---|---|---|
| 0012 | westliches (western) | "vEst$llC$@s |
| 0018 | Autobahnkreuz (highway intersection) | "?aU$to$ba:n$kROYts |
| 0019 | Anschlußstelle (junction) | "?an$SlUs$StEl$@ |
| 0022 | Raststätte (roadhouse) | "Rast$StE$t@ |

For example, the escape code 0019 in the above additional escape list represents the name component "Anschlußstelle" (junction) in an orthographic and a phonetic ("?an$S1Us$StE1$@) notation. This part of an escape list contains an escape code (EC) in the first column, a designation in an orthographic notation (RS) in the second column, and a designation in a phonetic notation (LS) in the third column.

For each location the location list 43 contains a location code (for example, 3038) and the location name (for example, Nordrhein Westfalen, Köln) in an orthographic and a phonetic notation. The location code is an encoded message and serves to address the relevant location name. Hereinafter, five examples from the location list are given:

| OC | RS | LS | Meaning |
|---|---|---|---|
| 3038 | 0018 2438 | ○○ | (Autobahnkreuz Olpe) (highway intersection Olpe) |
| 3109 | Lauf | "laUf | (Lauf) |
| 3621 | 0019 Kusel | ○ ku:$z@l | (Anschlußstelle Kusel) (junction Kusel) |
| 3783 | 0019 2429-Dellbrück | ○○ "dEl$bRYk | (Anschlußstelle Köln-Dellbrück) (junction Köln-Dellbrück) |
| 3796 | 0019 2429-Mühlheim | ○○ "my:l$halm | (Anschlußstelle Köln-Mühlheim) (junction Köln-Mühlheim) |

The above feasible location list contains the location code (OC) in the first column; the second column contains the location name in an orthographic notation (RS) or in a completely or partly encoded form as an escape code, and the third column contains the location name in a phonetic notation (LS) or in a completely or partly encoded form as a dummy which refers to a respective escape code in the second column of the location list. The above fourth column is not present in the location list and serves merely to indicate the meaning of the various escape codes in the location list. For example, if the entry under the location code "3038" is to be read by the chip card 17 in an orthographic and a phonetic notation, the control circuit 7 receives the character sequence "0018 2438" and "○ ○". The characters "0018" and "2438" represent escape codes in an escape list. Under the escape code "0018", for example "Autobahnkreuz" (highway junction) has presumably been entered in the above additional escape list, and presumably "Olpe" has been entered under the escape code "2438". A dummy "○" indicates the place whose the corresponding phonetic notations inserts to be read under the entries "0018" or "2438" in the escape list. In the control circuit 7 the location name searched under the address "2438" is then composed in an orthographic notation (Autobahnkreuz Olpe=highway intersection Olpe) and in a phonetic notation ("?aU$to$ba:n$kROYts "?O1$p@).

The lists described thus far contain an entry in an orthographic and a phonetic notation under a location or escape code. The entries in orthographic and phonetic notations are referred to as control data as stated above. The orthographic entry in the location list is to be understood hereinafter as a first main component and the phonetic entry in the location list as a first subsidiary component of the control data. The orthographic entry in the escape list is to be understood to be a second main component and the phonetic entry in the escape list a second subsidiary component.

The area location list 44 contains, for each respective area, an area code (for example, 4803), an area name in an orthographic notation (for example, Westliches Ruhrgebiet=Western Ruhr area), and an area name in a phonetic notation ("vEst$11C$@s "Ru:6$g@%bi:t). The area code serves to address the relevant area name. Four examples from a feasible area location list are given hereinafter:

| BC | RS | LS | Meaning |
|---|---|---|---|
| 4803 | 0012 Ruhrgebiet | ○ "Ru:6$g@%bi:t | (Westliches Ruhrgebiet) (western Ruhr area) |
| 4991 | Bayerischer Wald | "baI$RIS$=6_"valt | (Bayerischer Wald) |
| 4994 | Bodensee | "bo:$d@n$ze: | (Bodensee) |
| 4996 | Eifel | "?aI$f@l | (Eifel) |

The above part of a feasible area location list contains the area code (BC) in the first column; the second column contains the area names in an orthographic notation (RS) or completely or partly in encoded form as an escape code, whereas the third column contains the area names in a phonetic notation (LS) or completely or partly in encoded form as a dummy. The fourth column is not present in the area location list and is intended only to indicate the meaning of the individual escape codes in the area location list. For example, the entry "0012 Ruhrgebiet" in the second column (orthographic notation) means "Westliches Ruhrgebiet" under the area code 4803, because the escape code "0012" indicates the name component "Westliches". The dummy (○) refers to the phonetic entry ("vEst$11C$@s) under the address "0012". The orthographic entry in the area location list also constitutes a first main component and the phonetic entry constitutes a first subsidiary component.

The following control operations are then performed in the control circuit 7. When the control circuit 7 receives, for example the encoded message "4803", it is applied as an address or as a location code to the data ROM 28 on the chip card 17. The orthographic entry (0012 Ruhrgebiet) and the phonetic entry (○ "Ru:6$g@%bi:t) are applied to the control circuit 7 by the chip card 17. The control circuit 7 detects the escape code (0012) and reads the orthographic and the phonetic notation entered under this escape code in the memory 12. For example, on the basis of the first digit the control circuit 7 can decide whether it must read from the escape list in the memory 12 or from the escape list 46 in the data ROM 28. The orthographic entry "Westliches" is combined with the previously read entry "Ruhrgebiet". The phonetic entries are treated similarly. If only the phonetic notation is to be composed for application to the speech synthesizer circuit 14, the procedure is as follows. The control circuit recognizes the dummy "○" in the phonetic notation (○ "Ru:6$g@%bi:t) and, consequently, reads the associated escape code (0012) in the orthographic notation in the area location list. Subsequently, it reads the phonetic entry stored under this escape code in the escape list of the memory 12. After that, the phonetic notations are combined as explained above.

The segment location list 45 contains respective road segments in orthographic and phonetic notations and also a segment code which corresponds to an encoded message and serves to address the relevant road segment. Three examples from a feasible segment location list are given below:

| AC | RS1 | LS1 | RS2 | LS2 | RS3 | LS3 | Meaning |
|---|---|---|---|---|---|---|---|
| 5024 | 2511 | ○ | 2429 | ○ | 2418 | ○ | (A3, Köln, Oberhausen) |
| 5108 | 2509 | ○ | 2367 | ○ | 2388 | ○ | (A1, Dortmund, Euskirchen) |
| 5130 | 2511 | ○ | 2209 | ○ | Linz | "lInts | (A3, Passau, Linz) |

The segment code (AC) is stated in the first column of the segment location list 45. The second column contains the road designation in an orthographic notation (RS1) or an escape code referring to the orthographic road designation in the escape list 46 (for example, 2511). The third column contains the road designation in a phonetic notation (LS1) or a dummy which indicates the corresponding phonetic entry of the road designation in the escape list. The junctions of the road segments, representing the respective beginning and end of the relevant road segment, are given in an orthographic notation (for example, Linz) or completely or partly in encoded form as an escape code (for example, 2209) in the fourth and the sixth column (RS2, RS3). The fifth column and the seventh column contain the junctions in a phonetic notation or partly or completely in encoded form as dummies (LS2, LS3). The seventh column does not form part of the segment location list but serves to illustrate the meaning of the various escape codes (for example, Autobahn A3, Knotenpunkte (junctions) Passau and Linz). This segment location list contains a total of three first main components (RS1, RS2, RS3) and three first subsidiary components (LS1, LS2, LS3) of the control data stored under a respective segment code.

If desired, the location list, the area location list and the segment location list may also comprise further columns for supplying the user of the RDS-TMC broadcast receiver with further messages relating to given entries in the lists 43 to 46. The location code, the area code and the segment code are, as has already been stated, special names for respective encoded information.

In order to form a message in the RDS-TMC broadcast receiver which is complete and suitable for processing by the speech synthesizer circuit 14 or the display device 13, a further list containing standard phrases is stored in the memory 12. The memory 12 thus contains event-specific control data (in a standard phrase list) and traffic-specific control data (additional escape list). Such a standard phrase list enables, for example the following messages to be generated in an orthographic notation in the control circuit 7:

| | |
|---|---|
| 1 | Im Bereich Teutoburger Wald: Nebel (in the Teutoburger Wald area: fog) |
| 2 | Im Stadtgebiet Dresden: Sportveranstaltung (in urban Dresden: sporting event) |
| 3 | A2, Dortmund Richtung Hannover, zwischen Rehren und Lauenau: 4 km Stau (A2, Dortmund in the direction of Hannover, 4 km traffic jam between Rehren and Lauenau) |
| 4 | A4 Kölner Ring, Aachen Richtung Olpe, Autobahnkreuz Köln-Ost: Ausfahrt gesperrt (A4, Kölner Ring, Aachen in the direction of Olpe, highway intersection Köln-Ost: exit blocked) |
| 5 | A3, Köln Oberhausen, zwischen Anschluβstelle Köln-Dellbrück und Anschluβstelle Köln-Mühlheim: zähfließender Verkehr (A3, Köln Oberhausen, between junction Köln-Dellbrück and junction Köln-Mühlheim: slow moving traffic). |

Message No. 5 could have been received by the RDS-TMC broadcast receiver, for example in the following encoded form:

P1{5024,3783,3796},P2

The message consists of two standard phrases P1 and P2. In the standard phrase P1 the designations or name components stored under the codes (addresses or arguments of P1) "5024", "3783" and "3796" should be read from the chip card 17. For example, the code "5024" can be found in the segment location list. Under the segment code "5024" there is stored "A3 Köln, Oberhausen" in an orthographic notation. The other two arguments or codes of P1 can be found, for example in a location list. Under the location code "3783" there is stored "Köln-Dellbrück" in an orthographic notation and under the location code "3796" there is stored "Köln-Mühlheim" in an orthographic notation. If instead of the codes the corresponding designations in orthographic notation are inserted in the standard phrase P1, there is obtained:

P1{(A3, Köln, Oberhausen), Anschluβstelle (junction) K öln-Dellbrück, Anschluβstelle (junction) Köln-M ühlheim}+P2.

The following is the exact orthographic wording for the standard phrases P1 and P2 as derived from the standard phrase list:

P1=<Straβennummer>(road number),<Knotenpunkt>(junction), Richtung (direction)<Knotenpunkt>(unction), zwischen (between) <Ortsname>(location name) und (and)<Ortsname>(location name):

P2=zähfließender Verkehr (slow moving traffic).

Between the pointed brackets there are stated variables which must be replaced by the above names in orthographic notation (for example, A3).

The steps carried out in the control circuit 7 in order to compose a message to be displayed on the display device 13 are performed analogously so as to compose the phonetic notation applied to the speech synthesizer circuit 14.

The described RDS-TMC broadcast receiver and the chip card 17 are suitable for a user who receives the traffic messages in German by way of the display device 13 and/or the speech synthesizer circuit 14. Such an RDS-TMC broadcast receiver and chip card 17 can also be arranged for other languages. In that case the corresponding orthographic and/or phonetic notation of this language can be stored in the memory 12 and in the data ROM 28 of the chip card 17.

Furthermore, the RDS-TMC broadcast receiver and the chip card 17 can also be used for a plurality of languages. However, in order to minimize the expenditure a broadcast receiver should always be arranged for one special language (language-specific receiver). Therefore, in the memory 12 an orthographic and/or phonetic notation is stored for only one language (for example, German). In contrast therewith, however, a chip card 17 is conceived as a region-specific card. Its data ROM 28 stores region-specific data of a plurality of languages. For example, if it must be possible to use the German, English, French and Dutch languages, the lists stored in the data ROM 28 of the chip card 17 are extended. For example, under the escape code "2429" the escape list 46 then contains the following entry:

| EC | RSd | LSd | LSe | LSf | LSn |
|---|---|---|---|---|---|
| 2429 | Köln | "k9ln | ¶$k@"l@Un (Cologne) | ¶$ko"lOj (Cologne) | ¶"kui$l@n (Keulen) |

For the location "Köln" the escape list 46 contains the German orthographic notation (Rsd), the German phonetic notation (LSd), and the English (LSe), the French (LSf) and the Dutch (LSn) phonetic notation under the escape code (EC) "2429". If desired, orthographic entries for the non-German languages may also be stored. The orthographic notations of the non-German languages are stated between brackets underneath the relevant phonetic notation. The phonetic notations of the non-German languages represent further first subsidiary components of the control data which are stored under the escape code "2429". For the non-German languages, moreover, each phonetic notation is preceded by a first separating symbol (¶). These first separating symbols indicate that the non-German languages have been entered in the list in a predetermined order (standard order). The order of the list entries for the various languages is thus fixed. A standard order also exists if languages have been omitted at the end of the order (for example, Dutch).

If for a given designation no difference exists between the German phonetic notation and that in another language, the list will not contain a corresponding entry. For example, assume that the phonetic notation of the location "Köln" in French is identical to the phonetic notation in the German language. In this case the escape list 46 does not contain an entry for the French language. The relevant non-German languages in the list should then be marked for the location "Köln". For the marking of the phonetic notation in English a second separating mark "‡" with a further language-specific character (e) is inserted before the phonetic notation. For the Dutch language "‡n" is inserted. The second separating mark "‡" is thus supplemented by the language-specific character "n". The entry for the location "Köln" would have the following appearance in this assumed case:

| EC | RSd | LSd | LSe | LSn |
|---|---|---|---|---|
| 2429 | Köln | "k9ln | ‡e$k@"l@Un | ‡n"kui$l@n |

In the above exemplary location list 43 the location "Lauf" is entered under the location code "3109". For this location there are no corresponding English, French or Dutch orthographic and phonetic notations. If a designation (for example, the location "Lauf") is written and pronounced in the same way in English, French and Dutch as in German, no further orthographic or phonetic entry will be present.

In the case of a combination of at least one designation with different phonetic notations and at least one designation with the same phonetic notation in the various languages, the designation with the deviating phonetic notation is entered in the escape list 46 and the corresponding table contains the escape code for this designation. For example, in the location list 43 the location "Köln-Mühlheim" is presumably entered under the location code "3886". For "Köln" reference is made to the escape code "2429" in the location list 43. The designation "Mühlheim" is pronounced in the same way in all indicated languages. The corresponding entry in a location list 43 is then:

| | | |
|---|---|---|
| 3886 | 2429-Mühlheim | o"my:l$halm |

For the designation "Köln", the location list 43 does not require entries for the non-German languages, despite the different phonetic notation, because they are already present in the escape list 46.

Thus, the location list 43, the area location list 44, the segment location list 45 and the escape list 46 contain respective non-German phonetic notations if they deviate from the German language. Furthermore, the standard phrase list contains, for example entries in English, French and Dutch. For the German standard phrase "<Straβennummer>, <Ortsname>, 10 Kilometer Stau" (<road number>,<location name>, 10 km traffic jam)

there is a corresponding entry in French:

"Sur l'autoroute<Straβenname>à la hauteur de<Ortsname>, bouchon sur 10 kilometres".

For the road name and the location name the corresponding road name (for example, "A4") and the corresponding location name (for example, "Köln") must still be inserted in the control circuit 7.

In order to compose this message in the control circuit 7, first the corresponding control data is derived from the standard phrase list. If only entries in French are stored in the memory 12 (broadcast receiver for the French language), the control data contains only entries for the French language and it is not necessary to perform a selection from the control data. However, if the memory 12 contains entries for the French and the German language and the German language is defmed to be the first language, a selection of, for example the French phonetic entry is carried out after reception of the control data from the standard phrase list.

Subsequently, the French phonetic entries for the road designation "A4" and the location "Köln" are searched. For the location "Köln" it is then necessary to enter first the location list in which control data has been entered under a corresponding location code (encoded message). If the location list contains entries for the German language (as the first language) and can contain entries for the English, the French and the Dutch language, the corresponding French entry is searched after reception of the control data from the location list in the control circuit 7. This entry does not exist, because only an escape code has been entered in the first main component of the German language (German orthographic notation). The German phonetic notation may have been omitted or be a dummy. The control circuit 7 subsequently derives the control data of the corresponding escape code from the escape list 46 stored in the data ROM 28 of the chip card 17. The French phonetic notation for the location "K öln" is derived from the control data received and is inserted in the standard phrase. The same procedure is carried out by the control circuit 7 in order to extract the French phonetic entry for the road designation "A4".

Figure 4:
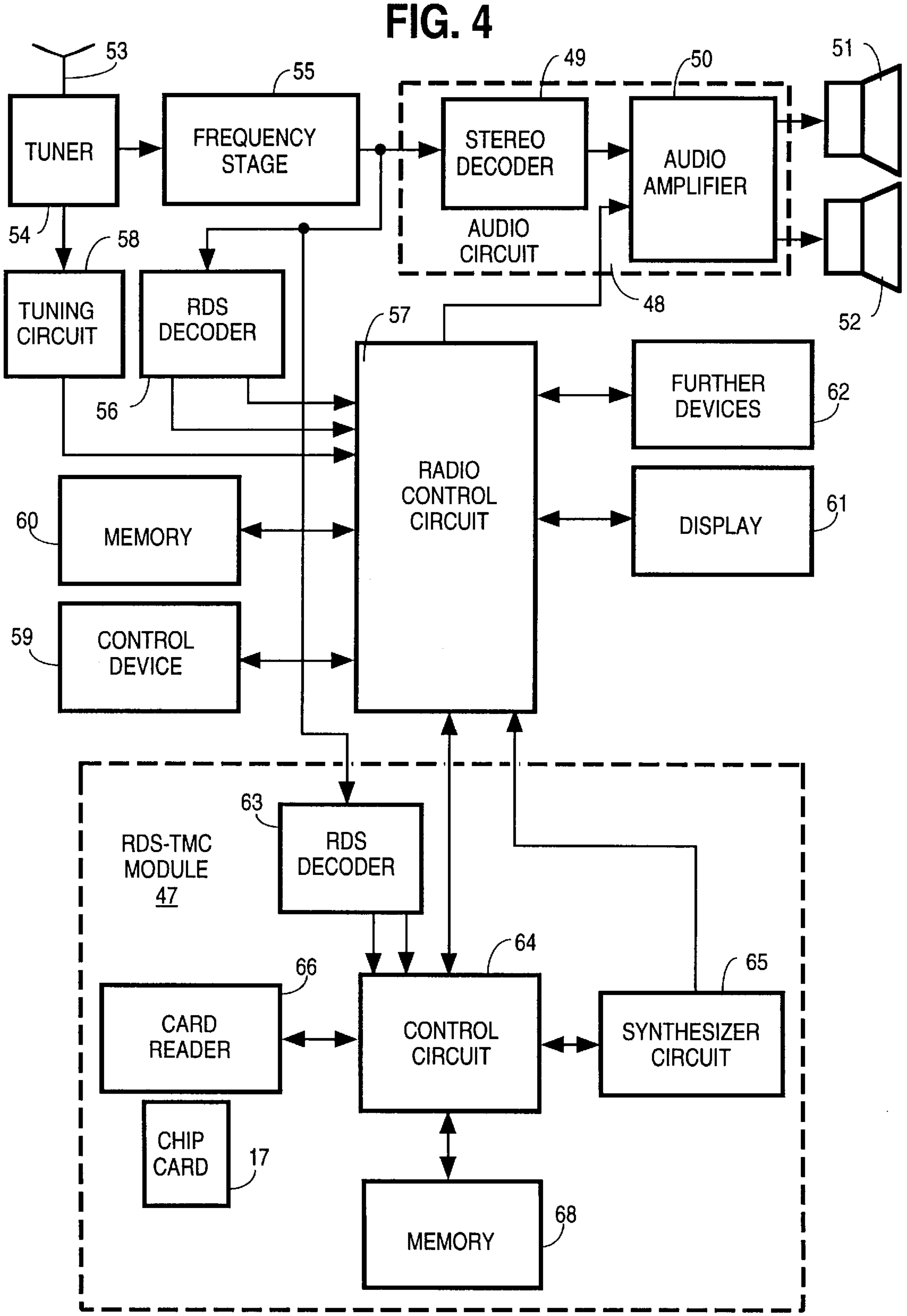
FIG. 4 shows an another embodiment of a received in accordance with the invention.

FIG. 4 shows a further broadcast receiver which is coupled to an RDS-TMC module 47 via a plurality of leads. The broadcast receiver comprises an audio circuit 48 with a stereo decoder 49 and an audio amplifier 50 and two loudspeakers 51 and 52. The audio circuit 48 receives a broadcast signal which is received via an aerial 53 and is conducted via a tuner 54 and an intermediate frequency stage 55. The stereo decoder 49 forms a low-frequency stereo signal which is applied to the loudspeakers 51 and 52 via the audio amplifier 50. The output signal of the intermediate frequency stage 55 is also applied to an RDS decoder 56 and the RDS-TMC module 47. The RDS decoder 56 derives RDS data from the low-frequency signal supplied by the intermediate frequency stage 55. The RDS data and a clock signal are applied to a radio control circuit 57 by the RDS decoder 56. The tuner 54 is adjusted by means of the RDS data and data supplied by a control device 59. To this end, the radio control circuit 57 applies the corresponding data to a tuning circuit 58 which controls the tuner 54.

A memory 60, a display device 61 and possibly one or more further devices 62, for example a cassette deck, a CD deck, a car telephone etc., are also coupled to the radio circuit 57. Furthermore, via a plurality of leads the radio control circuit 57 is coupled to the RDS-TMC module 47 which comprises an RDS decoder 63, a control circuit 64, a speech systhesizer circuit 65, a card reader 66 for receiving a chip card 67, and a memory 68. The RDS decoder 63 applies the RDS and TMC data derived from the output signal of the intermediate frequency stage 55 and a clock signal to the control circuit 64. The control circuit 64, processing RDS-TMC data like the control circuit 7 in FIG. 1, applies TMC data to the card reader 66 and on the basis of the data received from the card reader 66 and further data received from the memory 68 (data in orthographic and phonetic notation) it froms control data which is applied to the speech synthesizer circuit 65. From the control data the speech synthesizer circuit 65 produccs synthesized speech which is applied to the audio amplifier 50 via the radio control circuit 57. Furthermore, the control circuit 64 also forms, if desired, a traffic message in an orthogrphic notation from the control data, which message is applied to the display device 61 via the radio control circuit 57.

I claim:

1. A broadcast receiver, comprising
   a control circuit (7) for
      delivering encoded messages, derived from a broadcast signal, to at least one storage device (12, 28),
      receiving control data, derived from the encoded messages, from at least one storage device (12, 28), and
      forming the messages from the control data in a form suitable for a display device (13) and/or a speech synthesizer circuit (14), and
   at least one storage device (12, 28) storing stored control data under an encoded message, the stored control data comprising
      at least one spelling of a first language
      given spellings of predetermined further languages if they deviate from the first language, and
      a respective introductory separating mark for each spelling in one of the predetermined further languages.

2. A broadcast receiver as claimed in claim 1, wherein
   the at least one storage device (12, 28) stores the stored control data under a respective escape code,
   the control circuit (7) is arranged
      to apply at least one received escape code to the at least one storage device, in response to the control data containing the at least one received escape code, and
      to receive stored the control data stored under the received escape code.

3. A broadcast receiver as claimed in claim 2, characterized in that
   the spellings of further languages comprise a first introductory separating mark if they are stored in a standard order, and otherwise comprise a second introductory separating mark and a subsequent mark which characterizes the language.

4. A broadcast receiver as claimed in claim 3, characterized in that
   at least one storage device (12, 28) contains lists (43, 44, 45) which are associated with storage sections and contain specific control data associated with a respective encoded message and also contains an escape list (46) with the escape codes and the respective associated control data.

5. A broadcast receiver as claimed in claim 2, characterized in that
   the control data stored under a respective encoded message or an escape code in at least one storage device (12, 28) contains the extractable orthographic and/or phonetic notation of at least one first language and the extractable orthographic and/or phonetic notation of at least one further language only if the orthographic and/or phonetic notation of the further language deviate from the first language.

6. A broadcast receiver as claimed in claim 2, characterized in that
   at least one storage device (12, 28) contains lists (43, 44, 45) which are associated with storage sections and contain specific control data associated with a respective encoded message and also contains an escape list (46) with the escape codes and the respective associated control data.

7. A broadcast receiver as claimed in claim 2, wherein
   the stored control data contains extractable orthographic and/or phonetic notation corresponding to the at least one spelling and the given spellings.

8. A broadcast receiver as claimed in claim 7, characterized in that at least one storage device (12, 28) contains lists (43, 44, 45) which are associated with storage sections and contain specific control data associated with a respective encoded message and also contains an escape list (46) with the escape codes and the respective associated control data.

9. A broadcast receiver as claimed in claim 8, characterized in that
   the control circuit (7) is arranged to supply at least region-specific control data from a first storage device (28) and event-specific control data from a second storage device (12).

10. A broadcast receiver as claimed in claim 9, characterized in that
   at least the first storage device (28) forms part of a chip card (17) to be inserted into a card reader (16).

11. A broadcast receiver as claimed in claim 9, characterized in that
   at least the first storage device (28) contains an escape list (46).

12. A broadcast receiver as claimed in claim 11, characterized in that
   at least the first storage device (28) forms part of a chip card (17) to be inserted into a card reader (16).

13. A broadcast receiver as claimed in claim 12, characterized in that the encoded messages supplied with the broadcast signal are traffic messages.

14. A broadcast receiver as claimed in claim 1, characterized in that the encoded messages supplied with the broadcast signal are traffic messages.

15. A module (47) for the processing of encoded messages derived from a broadcast signal, comprising a control circuit (64) which is arranged to deliver encoded messages, derived from the broadcast signal, to at least one storage device (68, 28), receive control data, derived from the encoded messages, from at least one storage device (68, 28), and form the messages from the control data in a form suitable for a display device (59) and/or a speech synthesizer circuit (62), and at least one storage device (28, 68) storing stored controlled data under an encoded message, the stored control data comprising at least one spelling of a first language given spellings of predetermined further languages if they deviate from the first language, and a respective introductory separating mark for each spelling in one of the predetermined further languages.

16. A storage device (12, 28, 68) for a broadcast receiver, or for a module (47) for the processing of encoded messages derived from a broadcast signal, for the storage of control data for a respective encoded message, characterized in that the control data stored under an encoded message in the storage device (12, 28, 68) contains at least one spelling of a first language and given spellings of predetermined further languages if they deviate from the first language, and the spellings of all further languages comprise a respective introductory separating mark.

17. A chip card (17) for insertion into a card reader (16, 66) for a broadcast receiver, or for a module (47) for the processing of encoded messages derived from a broadcast signal, comprising a storage device (12, 28, 68) for storing control data associated with a respective encoded message, characterized in that the control data stored under an encoded message in the storage device (12, 28, 68) contains at least one spelling of a first language and given spellings of predetermined further languages if they deviate from the first language, and the spellings of all further languages comprise a respective introductory separating mark.

* * * * *